United States Patent [19]
Smith

[11] Patent Number: 6,045,593
[45] Date of Patent: Apr. 4, 2000

[54] ACID YELLOW DYE AND METHOD FOR USING SAME

[76] Inventor: Howard L. Smith, 406 Laurelwood Dr., Douglassville, Pa. 19518

[21] Appl. No.: 09/297,204

[22] PCT Filed: Nov. 18, 1997

[86] PCT No.: PCT/US97/21150

§ 371 Date: Apr. 27, 1999

§ 102(e) Date: Apr. 27, 1999

[87] PCT Pub. No.: WO98/22537

PCT Pub. Date: May 28, 1998

Related U.S. Application Data

[60] Provisional application No. 60/031,438, Nov. 20, 1996.

[51] Int. Cl.$^7$ .......................... C09B 29/12; C09B 67/22
[52] U.S. Cl. ................... 8/641; 8/639; 8/682; 8/683; 8/924; 534/844; 534/845
[58] Field of Search ................. 8/638–641, 924, 8/681–683; 534/844, 845

[56] References Cited

U.S. PATENT DOCUMENTS

| | | |
|---|---|---|
| 2,831,850 | 4/1958 | Merian et al. . |
| 2,969,350 | 1/1961 | Dolars et al. . |

FOREIGN PATENT DOCUMENTS

| | | |
|---|---|---|
| 524148 | 1/1993 | European Pat. Off. . |
| 2240940 | 3/1975 | France . |
| 2295085 | 7/1976 | France . |
| 2320336 | 3/1977 | France . |
| 2343782 | 10/1977 | France . |
| 2357683 | 2/1978 | France . |
| 2359882 | 2/1978 | France . |
| 1060521 | 7/1959 | Germany . |
| 56-038353 | 4/1981 | Japan . |
| 61055155 | 3/1986 | Japan . |
| 06332260 | 12/1994 | Japan . |

OTHER PUBLICATIONS

I. Cuculescu et al., "Dynamic Scattering in binary compensate cholesteric mixtures with pleochroic dye added" Displays, vol. 2 No. 3, Oct. 1980.

Chemical Abstracts, vol. 77, No. 18, abstract No. 121709m, B. P. Bhaduri et al, "Complexometric Titration of Copper with a new indicator" Oct. 1972.

*Primary Examiner*—Margaret Einsmann
*Attorney, Agent, or Firm*—Raymond D. Thompson; Paul Grandinetti

[57] ABSTRACT

The invention is a composition of matter useful as an acid yellow dye having formula (I)

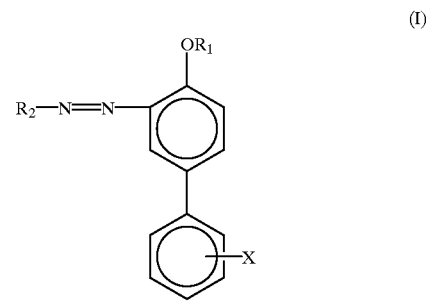

wherein: X is hydrogen or $SO_3^-M^+$; $M^+$ $Na^+$, $Li^+$, $K^+$, $NH_4^+$, or hydroxyalkylammonium of the formula $[H-(OCH_2CH_2)_n]_p NH_m$, where n is 1 to 5, p is 1 to 3, and p+m is 4; $R_1$ is hydrogen, a metal ion, an alkyl or $C_{1-4}$, of hydroxyalkyl of $C_{1-4}$, and combinations thereof; and $R_2$ is an unsubstituted aromatic ring or a substituted aromatic ring having at least one substituent, provided that when one of the substituents is $SO_3^-M^+$, X is hydrogen; and combinations thereof. The invention also includes a process for dyeing a material with this compound and the material so dyed.

42 Claims, No Drawings

ACID YELLOW DYE AND METHOD FOR USING SAME

This application is a 371 of PCT/US97/21150, Nov. 18, 1997 which claims priority from U.S. provisional application 60/031,438 Nov. 20, 1996.

BACKGROUND OF THE INVENTION

1. Field of the Invention

The invention relates to an acid yellow dye and a method for using the dye. Specifically, the invention relates to an acid yellow dye for use with dyeable polyamide polymers or "nylon" materials and a process for using the dye on polyamide fibers.

2. Description of Related Art

Synthetic dyes and dyestuffs have gained substantial commercial value for dying synthetic materials such as polyesters, polyamides, and cellulose ethers such as rayon. One class of synthetic dyes that has substantial market demand includes greenish-yellow dyes for polyamide materials. These dyes have great value for use in dyeing carpet and apparel.

Dyes used to color carpet and apparel materials must have good light fastness and good wash fastness as well as other characteristics. Standard tests exist within the industry to evaluate these characteristics of a dye.

The term "light fastness" refers to the ability of a dye to resist degradation from light, especially sunlight. The term "colorfastness to light" is sometimes used as a synonym for the term "light fastness." A standard for testing and rating light fastness is performed by exposing a dyed material to a light source of known spectrum and power and comparing the exposed, dyed material to a color standard after an exposure period.

The term "wash fastness" refers to the ability of a dye to resist degradation or removal from a substrate upon exposure to repeated washings. Standards for wash testing are also established. One such test is the "2A Wash Test" of the American Association of Textile Colorists and Chemists. This test washes a dyed material in a known concentration of a standard detergent.

The increased popularity of synthetic fiber materials in the 1960's and 1970's resulted in the development of standards for evaluating other dye characteristics for these fiber materials. The industry developed tests to compare dye compatibility so that one material can be dyed simultaneously by a plurality of dyes.

An article by Beckmann et al., "Practical Significance, Theory and Determination of Compatibility of Dyes on Synthetic-Polymer Fibres," *Journal of the Society of Dyes and Chemicals*, Vol. 88 (October 1972): 354–60, describes the "compatibility value K." The compatibility value K is essentially the product of the diffusion coefficient and the affinity of the dye. A dye of a lower K value "exhausts" before a dye with a higher K value.

An article by Otten, "Combination Indices for Acid Dyestuffs in Polyamide Dyeing," *Farben Review, No.* 21 (1972), describes parameters for dyeing procedures using a combination of dyes with different characteristics. This article describes the dye characteristics of combinability, levelness, and rate production of acid dyes on polyamide fibers. The absorption rate of acid yellow dye is discussed in combinations with acid blue and acid red dyes of different absorption rates.

The industry developed procedures and equipment for simultaneously applying a plurality of dyes onto a material. Trichromatic dye systems were developed for use in rapid, continuous dyeing applications. Such applications are often performed by high-speed, computer-controlled equipment.

U.S. Pat. No. 4,579,561 to Rowe et al. discloses a process for trichromatic dyeing of polyamide fibers. This patent discloses a system including an acid red component, an acid blue component, and an acid yellow component. Each of the dye components has compatible performance characteristics with the other dye components.

U.S. Pat. No. 5,234,467 discloses azo dye mixtures and their use for dyeing natural and synthetic polyamide fibers. The patent discloses yellow or orange dyes that are suitable in combination with other dyes. The disclosed dyes have very good compatibility for trichromatic dyeing systems.

The compatibility of individual dyes in a trichromatic or similar dye composition is determined in part by the respective "exhaust rates" of the dyes on the intended substrate material. Unlevel dyeing occurs when one of two or more dyes "strikes" too fast while a "sleeper" dye continues to exhaust. Dyers require a selection of dyes in order to develop combined dye compositions wherein the rate compatibility of the dyes is complementary for the process parameters required to dye a particular material.

Some acid yellow dyes exhibit undesirably rapid striking on polyamide fibers in dye compositions with an acid blue dye and/or an acid red dye. Dye compositions containing acid yellow dyes often fail to provide an "on tone" color on a polyamide fiber material. The "migration" characteristics of a dye on a fiber also affect the tone of the color on a polyamide fiber. Leveling agents are often required to compensate for differences between different acid dyes used in a dyeing process.

The industry requires an acid yellow dye having good light fastness and other properties for dyeing polyamide fiber. Also, the industry lacks acid yellow dye compositions wherein rate characteristics can be selectively altered to provide compatibility in a di- or trichromatic dye composition with acid blue dyes and/or acid red dyes. Additionally, the industry needs an acid yellow dye that reduces or eliminates the need for leveling agents in the dyeing process, which is advantageous for the dye houses in that it contributes to a reduction in the number of chemicals they need to use.

SUMMARY OF THE INVENTION

The present invention relates to a composition of matter comprising at least one compound of the formula:

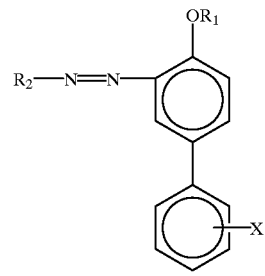

wherein:

X is hydrogen or $SO_3^- M^+$;

$M^+$ is $Na^+$, $Li^+$, $K^+$, $NH_4^+$, or hydroxyalkylammonium of the formula $[H-(OCH_2CH_2)_n]_p NH_m$, where n is 1 to 5, p is 1 to 3, and p+m is 4;

$R_1$ is hydrogen, a metal ion, an alkyl of $C_{1-4}$, or hydroxyalkyl of $C_{1-4}$, and combinations thereof; and $R_2$ is an unsubstituted aromatic ring or a substituted aromatic ring having at least one substituent, provided that when one of the substituents is $SO_3^-M^+$, X is hydrogen.

In a preferred aspect, the invention relates to an acid yellow dye having the following formula:

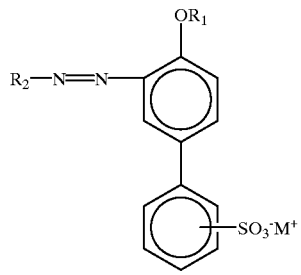

$M^+$ is $Na^+$, $Li^+$, $K^+$, $NH_4^+$, or hydroxyalkylammonium of the formula $[H-(OCH_2CH_2)_n]_p NH_m$, where n is 1 to 5, p is 1 to 3, and p+m is 4; $R_1$ is hydrogen, a metal ion, an alkyl of $C_{1-4}$, or hydroxyalkyl of $C_{1-4}$, and combinations thereof; and $R_2$ is a phenyl group substituted with at least one member selected from the group consisting of: alkyl; alkoxy; hydroxyalkoxy; halogen; hydroxyl; $C_2-C_6$ acylamino; perfluoroalkyl; substituted or unsubstituted benzoylamino; $HO_3SOCH_2CH_2SO_2^-$; vinyl sulfone or moiety that can undergo elimination to form the vinyl sulfone structure; amino substituted with an alkyl of $C_{1-4}$, a dialkyl of $C_{1-4}$, substituted or unsubstituted phenyl, diphenyl, or combinations thereof; and combinations thereof.

The invention also includes a process for dyeing a polymeric substrate material and the material so dyed. The process includes selecting at least one dye in accordance with the formula of the above-identified p-phenylphenol-based monoazo acid composition. This dye is selected for its compatibility and other characteristics with at least one other acid dye. The dyes are then mixed and reacted with the polymeric substrate.

DESCRIPTION OF THE PREFERRED EMBODIMENTS

The invention includes p-phenylphenol-based monoazo acid yellow dyes for dyeing polyamide materials. The dyes of the invention provide a shade of yellow to greenish-yellow to a substrate and have superior light fastness and other characteristics. The light fastness of dyes according to the invention is particularly good on polyamide fibers.

The yellow to greenish-yellow dyes of the invention correspond to the formula:

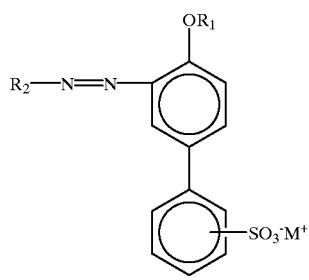

wherein the substituents are as follows.

$M^+$ is $Na^+$, $Li^+$, $K^+$, or $NH_4^+$, hydroxyalkylammonium of the formula $[H-(OCH_2CH_2)_n]_p NH_m$, wherein n is 1 to 5, p is 1 to 3, and p+m is 4. The most desirable embodiments of the invention have either a sodium ion or a lithium ion, or mixtures thereof, for this substituent.

$R_1$ is hydrogen, a metal ion, an alkyl of one to four carbon atoms, a hydroxyalkyl of one to four carbon atoms, or combinations thereof. The most desirable embodiments of the invention have a hydrogen, a methyl group, or an ethyl group for the $R_1$ substituent. Where $R_1$ is a metal ion, the most desirable metal ion is selected from the group consisting of sodium, lithium, potassium, and mixtures thereof.

When the $R_1$ substituent is a methyl or an ethyl group, the resulting acid yellow dye exhibits a slower strike rate on polyamide fiber than when the $R_1$ substituent is hydrogen. Dye compositions, wherein the acid yellow dye of the invention is a mixture of dye compounds having either a hydrogen or a methyl and/or an ethyl group for the $R_1$ substituent, can be formulated to control the strike rate of the mixed composition. The ratio of the dyes in the mixed composition can be varied to obtain a strike rate that is compatible with the strike rate for many acid blue dyes and acid red dyes. Desirable mixtures of such acid yellow dye compositions have a concentration of between about 5 percent and about 40 percent of dye wherein the $R_1$ substituent is a methyl and/or an ethyl group. The preferred concentration is between about 10 percent and about 30 percent. The preferred substituent is an ethyl group.

$R_2$ is an unsubstituted aromatic ring or a substituted aromatic ring having at least one substituent—provided that when one of the substituents is $SO_3^-M^+$, X is hydrogen—and combinations thereof.

$R_2$ is generated by the diazotization of an aromatic amine which is then coupled with the p-phenylphenol moiety. Amines that can be employed for this purpose include, but are not limited to, 2-aminothiazole, amino pyrazole, 2-amino-5-nitrothiazole, 5-amine3-phenyl-1,2,4-thiadiazole, 2-amino benzothiazole, dehydrothio-p-toluidine, sulfonic acid, and amines characterized by the formulas

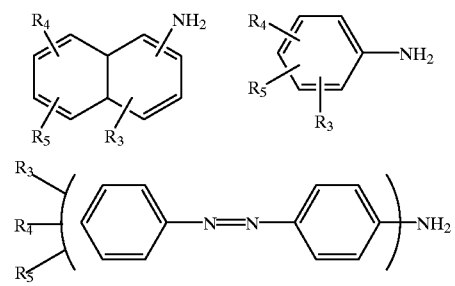

wherein $R_3$, $R_4$, and $R_5$ can be, independently, hydrogen, $-SO_3H$, $-COOH$, $C_1-C_6$ alkyl, $C_1-C_6$ alkoxy, halogen, $C_2-C_6$ alkanoylamino, unsubstituted or substituted phenyl, arylsulfonyl, sulfatoethyl sulfonyl, aryloxy, arylcarbonyl, phenylazo, naphthylazo, nitro radicals, or radicals of the formula

wherein $R_6$ and $R_7$ are $C_1-C_6$ alkyl or cycloalkyl or $R_6$ and $R_7$ constitute together a cyclic alkyl, cyclic alkylether, or cyclic alkylamine.

The amines of the above formulas are known or can be prepared by those skilled in the art. Representative examples include, but are not limited to, a wide range of diazotizable amines such as aniline, o-toluidine, m-toluidine, p-toluidine, p-butylaniline, 2,4-xylidine, p-dodecylaniline, 4-amino-3-nitroacetanilide, 5-acetamino-2-aminophenol-3-sulfonic acid, m-aminoacetanilide, p-aminoacetanilide, 3-amino-4-methylacetanilide, 4-aminoacetanilide-3-sulfonic acid, 2-amino-4-acetamidophenylmethyl sulfone, p-nitroaniline, 2-methyl-4-nitroaniline, 2,4-dinitroaniline, 6bromo-2,4-dinitroaniline, 2-amino-4-nitrophenol, 2-amino-5-nitrophenol, 2-amino-4-methyl-6-nitrophenol, 2-amino-4-chloro-6-nitrophenol, 2-amino-4-nitrophenol-6-sulfonic acid, 4-amino-N-methylacetanilide, 2-amino-5-nitrobenzoic acid, 2-amino-6-4-sulfobenzoic acid, 2-methoxy-4-nitroaniline, 4-methoxy-2-nitroaniline, 4-chloro-2-nitroaniline, 2-bromo-6-methyl-4-nitroaniline, 2,6-dichloro-4-nitroaniline, 2,6-dibromo-4-nitroaniline, 4-nitroaniline-2-sulfonic acid, 2-aminophenol, 2-amino-4-methylphenol, 2-amino-4-chlorophenol, 2-amino-5-methylsulfonylphenol, 2-aminophenol-4-sulfonamide, 2-aminophenol-4-N-methylsulfonamide, 2-aminophenol-4-sulfonic acid, 3-aminoacetophenone, anthranilic acid, o-anisidine, p-cresidine, dimethoxy para base, para base sulfate, dimethoxy para base sulfate, 2-chloroaniline, 4-chloroaniline, 2,6-dichloroaniline, 2-aminobenzotrifluoride, 2-amino-5-chlorobenzotrifluoride, 2,5-dichloroaniline-4-sulfonic acid, 2-chloroaniline-5-sulfonic acid, orthanilic acid, metanilic acid, sulfanilic acid, 4-amino-4'-nitrodiphenylamine-2'-sulfonic acid, 4-aminoazobenzene-4'-sulfonic acid, 2-amino-N-ethyl-N-phylbenzenesulfonamide, 2-naphthylamine-6-sulfonic acid, 2-naphthylamine-4,8-disulfonic acid, 2-amino-8-naphthol-6-sulfonic acid, 1-amino-8-naphthol-3,6-disulfonic acid, 4-aminoazobenzene-3'-sulfonic acid, 2-naphthylamine-1-sulfonic acid, 2-naphthylamine-6-sulfonic acid, 2-amino-1, 1'-diphenylsulfone, 2-amino-N-cyclohexyl-N-methylbenzenesulfonamide, and 1-[(2-aminophenyl)sulfonyl]azacycloheptane.

$R_2$ is preferably a phenyl group substituted with alkyl; alkoxy; hydroxyalkoxy; halogen; hydroxyl; $C_2$–$C_6$ acylamino; perfluoroalkyl; substituted or unsubstituted benzoylamino; $HO_3SOCH_2CH_2SO_2^-$; $SO_3^-M^+$; vinyl sulfone or moiety that can undergo elimination to form the vinyl sulfone structure; or a substituted amino. The amino group can be substituted with any of alkyl or dialkyl of one to four carbon atoms, phenyl, diphenyl, or combinations thereof.

The phenyl group can have one or more substituents. Desirable embodiments of the invention have a substituent on the benzene ring meta or para to the azo group. Desirable dyes are provided when the substituent in the meta or para position is a halogen or a member selected from the group consisting of an ethoxy, a methoxy, a hydroxyl, a 2-hydroxypropoxy, a 2-hydroxybutoxy, and mixtures thereof.

Desirable acid yellow dyes of the invention are provided by mixtures of embodiments having different selections for the $R_2$ substituent. For example, a first concentration of dye wherein $R_2$ is phenyl substituted with a halogen at the position meta to the azo group and with another substituent on the benzene ring can be selectively mixed with a second concentration of dye wherein $R_2$ is phenyl substituted with a member selected from the group consisting of an ethoxy group, a methoxy group, a hydroxyl group, a 2-hydroxypropoxy group, a 2-hydroxybutoxy group, and mixtures of these such that one group is para to the azo group.

The presence of a halogen on the benzene ring of the $R_2$ substituent improves the wash fastness characteristic of the resulting acid yellow dye. A preferred embodiment of the invention is an $R_2$ phenyl substituent having a methoxy group and a halogen on the benzene ring.

In one embodiment of the invention, acid yellow dye compositions are obtained from mixtures of dyes wherein the $R_2$ phenyl substituent is halogen for a first dye and halogen-free for a second dye. Such embodiments can include another group on the phenyl ring of the first dye and/or the second dye. These mixed dye compositions provide desirable light fastness, wash fastness, and other characteristics. It is preferred that where such mixed dye compositions are employed, they contain concentrations of about 20 percent to about 50 percent of the halogenated first dye.

The invention includes a process for dyeing a material, such as a polyamide fiber or fabric. The process includes selecting at least one first acid dye for the material. Preferably, the K value and/or other dye characteristics are known for the first acid dye. A second step of selecting occurs for at least one second acid dye. The second acid dye is an acid yellow dye according to the invention and is selected to be compatible with the first acid dye on the material. The first acid dye is mixed with the second acid yellow dye at an effective dyeing temperature and an effective concentration for the material. The material is immersed into the heated mixture of the first acid dye and the second acid yellow dye for sufficient time to exhaust both the first acid dye and the second acid yellow dye. The dyed material is then dried.

The selection of the compatible acid yellow dye in the process of this invention can include a composition of halogen and halogen-free acid yellow dye or other combinations as explained above. The compatibility characteristics of the selected dye can reduce or eliminate the need for a leveling agent in the dyeing process. The effective dyeing temperatures for the process are between ambient temperature and about 205° F. (about 96° C.). The time sufficient to exhaust the first acid dye and the second acid yellow dye is between about 2 minutes and about 20 minutes for most materials and concentrations of acid dyes.

EXAMPLES

The following general procedures are used in the examples of the invention unless otherwise indicated. The general procedures include (1) a process for synthesizing an embodiment of the acid yellow dye, (2) a process for dyeing a polyamide fiber, and (3) a process for evaluating and comparing the strike rate of the acid yellow dye. These general procedures are directed to laboratory scale processes, but can be adapted for industrial scale processes.

Process for Preparing Acid Yellow Dye

The acid yellow to greenish-yellow dye of this invention can be synthesized according to the following general procedure. Variations to the process steps can be made within the scope of this invention.

An aromatic amine is diazotized and coupled to p-phenylphenol by means familiar to those skilled in the art. The aromatic amine may or may not contain a p-benzenesulfonyloxy group. The resulting dye is isolated, washed, and dried.

Then, the dried material is added to sulfuric acid and sulfonated in a manner well-known to those skilled in the art. The sulfonation mixture is drowned in ice water and filtered. The filter cake is washed and the sulfonic acid group is neutralized to form a salt. If a p-benzenesulfonyl group is present, it is then removed with dilute alkali. The resulting compound may be alkylated in an alkaline medium by known methods.

Process for Dyeing Acid Yellow Dyes on Nylon 6,6

The acid yellow to greenish-yellow dye of this invention can be applied to a polyamide fiber according to the following general procedure. Variations to the process steps can be made within the scope of this invention.

Ten parts of nylon 6,6 jersey material or fabric are dyed in 100 parts of an aqueous liquor or dyebath. One liter of the aqueous liquor contains one gram of monosodium phosphate and, optionally, one gram of a leveling agent, such as the leveling agent sold under the trade name Cenegen NWA. One percent dyestuff "on weight of fiber" (o.w.f.) is added to the dyebath. The temperature of the dyebath is raised from ambient temperature at a rate of 3° F. (1.7° C.) per minute to 212° F. (100° C.) and maintained at 212° F. (100° C.) for 15 minutes. At intervals of 10 minutes, 0.5, 1.0, and 2.0 parts of a one percent acetic acid solution are added as an exhausting agent. The dyebath is cooled to 160° F. (71° C.), and the fabric is removed and rinsed in water. The dyed fabric is dried and pressed. The dyed fabric exhibits a level bright-yellow dyeing with excellent overall fastness properties.

Process for Evaluating Strike Rate

The compatibility characteristics of the acid yellow to greenish-yellow dye of this invention can be evaluated on a polyamide fiber according to the following general procedure. Variations to the process steps can be made within the scope of this invention.

The two following procedures are each performed on two dyes. The first dye is the dye being evaluated for strike rate compatibility. The second dye is the standard dye and is used for comparison purposes. In other words, the second dye is the dye to which compatibility of the first dye is desired. The term "strike rate" as used to describe this invention refers to the exhaust rate and dyeing rate of acid dyes on polyamide material.

Certain examples compare a specific compound of the invention to commercially available C.I. Acid Blue 324 and C.I. Acid Red 266 dyes. These two commercially available dyes have known K values. The comparison of a yellow acid dye of the invention with these two dyes approximates the K value for the specific acid yellow dye of an example. The comparisons are not performed to identify a yellow acid dye having a matching compatibility with these specific acid blue and red dyes.

1. Strike Rate as a Function of Temperature

The strike rate of an acid dye is evaluated as a function of temperature as follows. This procedure is performed both on a dye that is being evaluated, and on a dye that is being used as a standard.

Six separate dyeings ((a) through (f)) are prepared from six pieces of nylon 6,6 jersey material of five grams each. The six pieces of fabric are pre-wetted with deionized water. The six pieces of wetted fabric are dyed in 100 milliliters of an aqueous liquor or dyebath. One liter of the dyebath contains one gram of monosodium phosphate and, optionally, one gram of a leveling agent, such as the leveling agent sold under the trade name Cenegen NWA. The dyebath is adjusted to a pH of 6.5 with disodium phosphate.

The six dyeings are then performed as follows:

(a) The fabric is removed after five minutes at 70° F. (21° C.);

(b) The fabric is removed after reaching 120° F. (49° C.);
(c) The fabric is removed after reaching 140° F. (60° C.);
(d) The fabric is removed after reaching 160° F. (71° C.);
(e) The fabric is removed after reaching 180° F. (82° C.); and
(f) The fabric is removed after staying at 205° F. (96° C.) for 30 minutes.

The fabric from the six dyeings is then compared for tone. A tone-on-tone comparison of all six dyeings establishes the compatibility of the dyes.

2. Strike Rate as a Function of Time

The strike rate of an acid dye is evaluated as a function of time as follows. This procedure is performed both on a dye that is being evaluated and on a dye used as a standard.

Five separate dyeings ((a) through (e)) are prepared from five pieces of nylon 6,6 jersey material of five grams each. The five pieces or material are pre-wetted with deionized water. The five pieces are dyed in 100 milliliters of an aqueous liquor or dyebath. One liter of the dyebath contains one gram of monosodium phosphate and, optionally, one gram of a leveling agent, such as the leveling agent sold under the trademark Cenegen NWA. The dyebath is adjusted to pH of 6 with disodium phosphate. Then, 2.0 percent o.w.f. of a dyestuff with an unknown K value and 2.0 percent o.w.f. of a blue or red dyestuff with a known K value are added to the dyebath at 70° F. (21° C.).

The temperature of the dyebath is elevated and maintained at 140° F. (60° C.). The first piece (a) of fabric is immersed in the dyebath and replaced after two minutes by the second piece (b) of fabric. The second piece of fabric is replaced after two minutes by the third piece (c) of fabric. The third piece of fabric is replaced after two minutes by the fourth piece (d) of fabric. The fourth piece of fabric is replaced after five minutes by the fifth piece (e) of fabric. The fifth piece of fabric remains in the dyebath until all remaining dye is exhausted. Full exhaustion of dye can be achieved by the addition of acetic acid.

The K value is estimated according to visual examination of the tone-on-tone accumulation of dye on all five dyeings. A similar K value or compatibility exists between the two dyes when a comparison of the respective five pieces of fabric exhibit comparable tone-on-tone characteristics.

EXAMPLE 1

The general procedures for the dye of this example were used with the following exceptions.

A mixture of 40 grams of sodium carbonate, 30.3 grams of p-hydroxyacetanilide, 43 grams of benzenesulfonyl chloride, 5 grams of water, and 180 grams of acetone is refluxed for two hours. The mixture is cooled to 25° C. and added to 500 milliliters of cold water. The mixture is stirred for three hours at 25° C., and the pH is adjusted to 8 to 9 by adding two to three grams of sodium carbonate in small increments. This step is followed by extended stirring at 20° C. to 25° C. for 15 hours. The pH is adjusted to 2 to 3 with hydrochloric acid, and the mixture is stirred for 30 minutes. After adding 70 milliliters of 31.5 percent hydrochloric acid, the mixture is heated to 90° C. to 95° C. and stirred at this temperature three hours. The heated mixture is diluted to 600 to 650 milliliters with cold water and cooled to 25° C. while being stirred. The resulting slurry is diazotized by cooling to 5° C. to 10° C. with ice and adding 47 grams of a 30 percent sodium nitrite solution for 40 to 60 minutes. The temperature is allowed to rise 10° C. to 15° C. and stirred for one to two hours. After adding sulfamic acid to remove residual nitrous acid, the mixture is clarified by filtration with a filter aid.

A solution of 36.5 grams of p-phenylphenol in 80 grams of 95 percent denatured alcohol at 35° C. to 40° C. is cooled to 30° C. and added to a stirred solution of 8 grams of Petro AG Special and 30 grams of sodium carbonate in 300 grams of water at 25° C. The resulting slurry is cooled to 5° C. to 10° C. by adding ice. Then, the clarified diazonium salt solution is added during 1 to 1.5 hours while maintaining the temperature at 10° C. to 15° C. by adding ice as required. The pH is maintained at 9 to 9.5 by adding 20 grams of sodium carbonate. The mixture is stirred for 15 minutes and acidified to a pH of 3 by adding 81 milliliters of 31.5 percent hydrochloric acid. After the mixture is stirred at a pH of 3 for 30 minutes, the pH is adjusted to 5 to 6 with 50 percent sodium hydroxide, whereupon the dye is filtered, washed, and dried at 95° C. in air. A yield of 87.2 grams of product is obtained with the following formula:

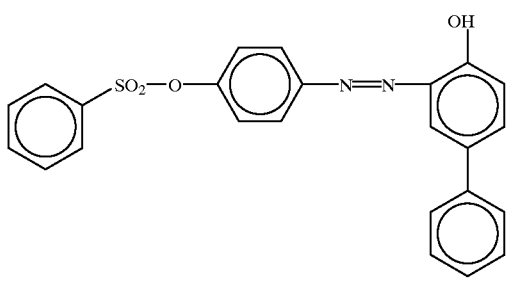

EXAMPLE 2

This example produces an acid yellow dye according to the invention. The general procedures for synthesizing the dye of this example were used with the following exceptions.

A mixture of 128 grams of 20 percent oleum and 72 grams of 93.2 percent sulfuric acid is cooled to 5° C. to 10° C. While being stirred, a quantity of 43.6 grams of the dye described in Example 1 is added with an ice-water bath at a rate as to maintain the temperature at 10° C. The mixture is then stirred at 10° C. for four to five hours and added to a stirred mixture of 110 grams of salt, 100 grams of water, 200 grams of ice, and a small amount of defoamer. Ice is added during the addition of the reaction mass to achieve a temperature of 10° C. to 15° C. After stirring at 10° C. to 15° C. for one hour, the mixture is filtered and washed with salt water and yields 86.6 grams of filter cake.

The benzenesulfonyl group is hydrolyzed by adding the filter cake to 80 grams of water and 10 grams of 50 percent sodium hydroxide, followed by heating to 70° C. and stirring at 200 milliliters for 20 minutes. Sixteen grams of 50 percent sodium hydroxide are then added, and the mixture is heated to 90° C. to 95° C. and stirred at 90° C. to 95° C. for three hours. The mixture is cooled to 35° C., and the pH is adjusted to 11 by adding 10 milliliters of 31.5 percent hydrochloric acid. A solution of 262 grams is obtained with the following formula:

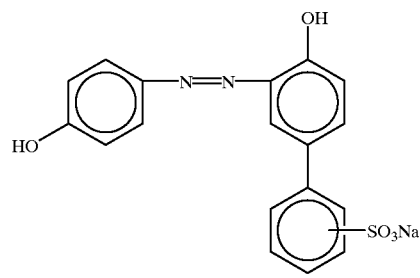

EXAMPLE 3

This example produces an acid yellow dye according to the invention. The general procedures for synthesizing, dyeing, and evaluating the dye of this example were used with the following exceptions.

A solution of dye is prepared as described in Example 2 except that 40 grams of the dye resulting from coupling p-benzenesulfonyloxyaniline diazonium salt with p-phenylphenol (as in Example 1) is sulfonated and hydrolyzed instead of 43.6 grams. The solution is cooled to 55° C., and the pH is adjusted to 10 with hydrochloric acid. After adding 10 percent salt by volume, the slurry is cooled to 25° C. The pH is adjusted to 9.2 with hydrochloric acid. Additional salt is added to a total of 45 grams, and the volume is adjusted to 300 milliliters. After stirring for 20 minutes, the slurry is filtered and washed with 10 percent salt water. The filter cake is dried at 95° C. in air. A solution of 30.2 grams of dye is obtained. The dye colors polyamide greenish-yellow in a weak acid bath. The dye has the following structure:

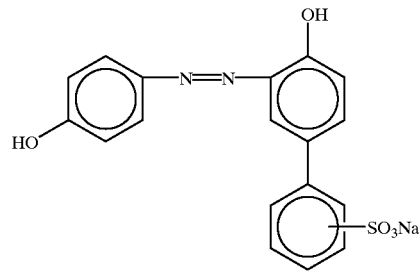

The dye has good light fastness (3–4, 60 hours exposure) and good wash fastness (4—stain on cotton). When a polyamide material is dyed in a weak acid bath using a mixture of the dye of Example 3 along with C.I. Acid Blue 324 and C.I. Acid Red 266 during controlled intervals of time, the resulting colors of dyed material indicate that the dye of Example 3 exhausts more rapidly than C.I. Acid Blue 324 and C.I. Acid Red 266 (K less than 3.2).

EXAMPLE 4

This example produces an acid yellow dye according to the invention. The general procedures for synthesizing, dyeing, and evaluating the dye of this example were used with the following exceptions.

A solution of dye is prepared as described in Example 2 and is alkylated by the addition of 38 grams of dimethyl sulfate at 35° C. to 40° C. with a pH of 10 to 11. This pH is maintained by the addition of 50 percent sodium hydroxide as needed. After being stirred at a pH of 10 to 11 at 30°

C. to 35° C. for two hours, the mixture is filtered and washed with cold 7.5 percent salt water and air-dried at 95° C. A mixture of 35.5 grams is obtained with the following formula:

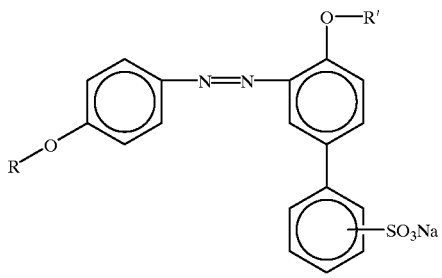

R = H, CH₃; R' = H, CH₃

Analysis by high pressure liquid chromatography indicates that approximately 29 percent has the structure: R=CH₃, R'=H; 56 percent has the structure R=CH₃, R'=CH₃; and approximately 1.3 percent has the structure R=H, R'=H. When the dye is applied to polyamide material, yellow shades are obtained with very good light fastness (4–5, 80 hours exposure) and good wash fastness (5—stain, 5—shade change). When polyamide is dyed using a mixture of the dye of Example 4 along with C.I. Acid Blue 324 and C.I. Acid Red 266 during controlled intervals of time, the resulting colors of dyed material indicate that the dye of Example 4 exhausts at a slower rate than the dye of Example 3 (K=about 3.7).

EXAMPLE 5

This example produces an acid yellow dye according to the invention. The general procedures for synthesizing, dyeing, and evaluating the dye of this example were used with the following exceptions.

The preparation of Example 4 is repeated, except that 45 grams of dimethyl sulfate is added at 35° C. to 40° C. while maintaining the pH at 10 to 11 by adding 50 percent sodium hydroxide. After stirring for two hours, the mixture is salted, filtered, and washed as in Example 4. The wet filter cake of 69.3 grams is air-dried at 95° C. A mixture of 30.5 grams of dye is obtained with the following formula:

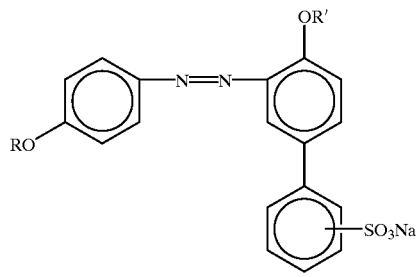

R = CH₃; R' = H, CH₃

Analysis by high pressure liquid chromatography indicates that approximately 23 percent has the structure R=CH₃, R'=H, and 63 percent has the structure R=CH₃, R'=CH₃. Polyamide material is dyed yellow in a weak acid bath and has very good light fastness (4–5 after 80 hours exposure) and good wash fastness (4—shade change, 5—stain). When the dye is applied as a mixture with C.I. Acid Blue 324 and C.I. Acid Red 266 during controlled intervals of time, the colors of the dyeings indicate that the exhaust rate of the dye of Example 5 is slightly slower than the dye of Example 4 (K=about 3.9).

EXAMPLE 6

This example produces an acid yellow dye according to the invention. The general procedures for synthesizing, dyeing, and evaluating the dye of this example were used with the following exceptions.

The preparation of Example 2 is repeated, and the resultant mixture is treated with 31 grams of diethyl sulfate at 35° C. to 40° C. at a pH of 10 to 11. The mixture is stirred for two hours at 40° C. to 45° C. The resulting mixture is adjusted to a pH of 6 to 7 with hydrochloric acid, salted, cooled, and filtered. After washing the mixture with salt water, the filter cake is dried in air at 95° C. A mixture of 41 grams of dye is obtained with the formula:

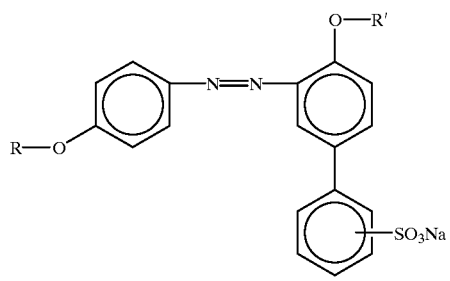

R = H, CH₃CH₂; R' = H, CH₃CH₂

Analysis by high pressure liquid chromatography indicates that approximately 58 percent has the structure: R=CH₃CH₂; R'=H; 29 percent has the structure: R=CH₃CH₂, R'=CH₃CH₂; and approximately 1.2 percent has the structure: R=H, R'=H.

Polyamide material is dyed greenish-yellow in a weak acid bath and has very good light fastness (4–5 after 80 hours exposure) and good wash fastness (4—shade change, 5—stain). The polyamide material is dyed using a mixture of the dye of Example 6 along with C.I. Acid Blue 324 and C.I. Acid Red 266, during controlled intervals of time. The resulting colors of dyed material indicate that the dye of Example 6 exhausts at a rate similar to C.I. Acid Red 266 and C.I. Acid Blue 324 (K=about 3.3).

EXAMPLE 7

This example produces an acid yellow dye according to the invention. The general procedures for synthesizing, dyeing, and evaluating the dye of this example were used with the following exceptions.

Approximately 0.09 mole of the dye of Example 3 is added to 100 grams of water, and the pH is adjusted to 9 at 250 milliliters. After adding 20 grams of 1,2-butylene oxide, the mixture is refluxed for 15 to 20 hours. The mixture is cooled to 20° C., 30 grams of salt is added, and the pH is adjusted to 9 to 9.5 by adding acetic acid and sodium carbonate solution. After stirring for one hour, the mixture is filtered and washed with cold 10 percent salt water. The filter cake is dried at 110° C. in air. A mixture of 44.1 grams of dye is obtained with the following structure:

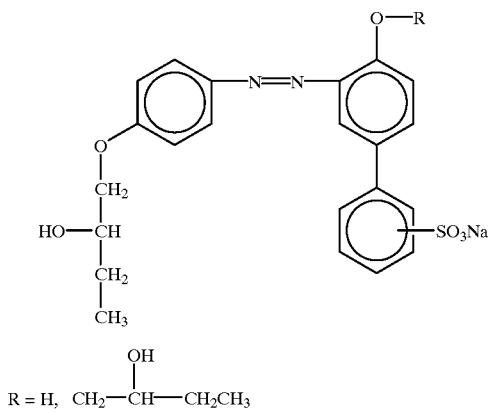

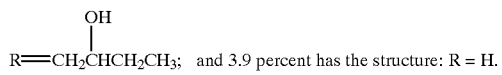

Analysis via HPLC indicates that approximately 79 percent has the structure:

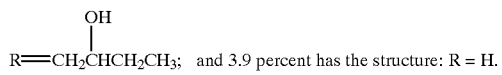

$R = CH_2CHCH_2CH_3$; and 3.9 percent has the structure: R = H.

Polyamide material is dyed yellow in a weak acid bath. When polyamide material is dyed in a weak acid bath using the dye of Example 7 along with C.I. Acid Blue 324 and C.I. Acid Red 266 during controlled intervals of time, the resulting colors indicate that the dye exhausts at a much slower rate than the dyes of the previous examples or C.I. Acid Yellow 135 (K=about 4.7).

EXAMPLE 8

This example produces an acid yellow dye according to the invention. The general procedures for synthesizing, dyeing, and evaluating the dye of this example were used with the following exceptions.

An amount of 32 grams of 3-chloro-4-methoxyaniline is diazotized by stirring in 200 grams of water and 58 grams of 31.5 percent hydrochloric acid at 5° C. to 10° C. followed by the addition of 46 grams of 30 percent sodium nitrite solution during 30 to 60 minutes. Impurities are removed by filtration. Then, 34.3 grams of p-phenylphenol are dissolved in 200 grams of water with wetting agents and 20 grams of 50 percent sodium hydroxide at 70° C. The solution is cooled to 25° C. with ice and precipitation occurs. After the addition of 26 grams of soda ash, the mixture is further cooled to 5° C. by adding ice. The filtered diazonium salt solution is then added over two to three hours at a temperature of 5° C. to 10° C. After coupling, the pH of the mixture is adjusted to 2 to 3 with hydrochloric acid. The mixture is stirred for a few minutes, and the pH is adjusted to 6 with 50 percent sodium hydroxide. The resulting dye is filtered, washed with cold water, and dried in air at 80° C. to 85° C. A yield of 69.5 grams of dye is obtained with the following structure:

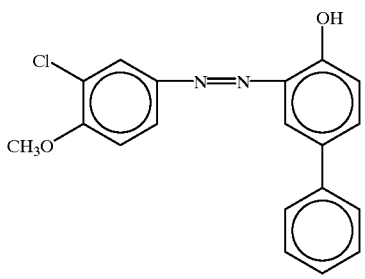

Then, a quantity of 34.8 grams of the dried material is added to 180 grams of 97.1 percent sulfuric acid at 10° C. and stirred at 10° C. to 15° C. for 6.5 hours. The mixture is added to 75 grams of salt and 5 grams of wetting agent in 90 grams of water and 300 grams of ice. After stirring at 21° C. for 40 minutes, the mixture is filtered and washed with five percent salt and one percent hydrochloric acid. The acid cake of 171.5 grams is added to 150 grams of water, 2 grams of wetting agent, and 10 grams of 50 percent sodium hydroxide at 30° C. to 35° C. The pH is lowered from 11 to 12 to a pH of 9.5 with hydrochloric acid, and the resulting slurry is salted with 20 grams of salt at a volume of 400 milliliters and filtered. The filter cake is washed with five percent salt water and dried in air at 95° C. A yield of 45.2 grams of dye is obtained with the following structure:

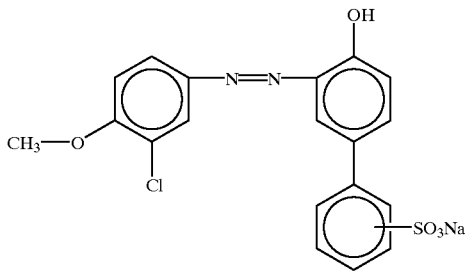

A polyamide material is dyed greenish-yellow in a weak acid bath. The dye has very good light fastness (4–5 after 80 hours exposure) and wash fastness (5—shade change, 5—stain). The polyamide material is dyed along with a mixture of the dye of this example and with C.I. Acid Blue 324 and C.I. Acid Red 266 during controlled intervals of time. The resulting dyeings indicate that the exhaust rate of the dye of Example 8 is slower than C.I. Acid Blue 324 and C.I. Acid Red 266. The exhaust rate is somewhat more rapid than Examples 4 through 6 (K=3).

What is claimed is:

1. A dye of the formula:

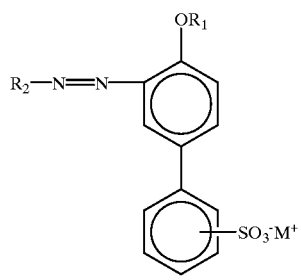

wherein:

M⁺ is $Na^+$, $Li^+$, $K^+$, $NH_4^+$, or hydroxyalkylammonium of the formula $[H-(OCH_2CH_2)_n]_p NH_m$, where n is 1 to 5, p is 1 to 3, and p+m is 4;

$R_1$ is hydrogen, a metal ion, an alkyl of $C_{1-4}$, or hydroxyalkyl of $C_{1-4}$, and combinations thereof; and $R_2$ is a phenyl group substituted with at least one member selected from the group consisting of: alkyl; alkoxy; hydroxyalkoxy; halogen; hydroxyl; $C_2-C_6$ acylamino, perfluoroalkyl, substituted or unsubstituted benzoylamino;

$HO_3SOCH_2CH_2SO_2^-$; vinyl sulfone or moiety that can undergo elimination to form the vinyl sulfone structure; amino substituted with an alkyl of $C_{1-4}$, a dialkyl of $C_1-C_4$, substituted or unsubstituted phenyl, diphenyl, or combinations thereof; and combinations thereof.

2. The dye of claim 1 wherein $R_2$ is a phenyl group with a methoxy group para to the azo group.

3. The dye of claim 1 wherein $R_2$ is a phenyl group with an ethoxy group para to the azo group.

4. The dye of claim 1 wherein $R_2$ is a phenyl group with a 2-hydroxypropoxy-group para to the azo group.

5. The dye of claim 1 wherein $R_2$ is a phenyl group with a 2-hydroxybutoxy-group para to the azo group.

6. The dye of claim 2 wherein M⁺ is $Na^+$.

7. The dye of claim 3 wherein M⁺ is $Na^+$.

8. The dye of claim 4 wherein M⁺ is $Na^+$.

9. The dye of claim 5 wherein M⁺ is $Na^+$.

10. The dye of claim 1 wherein $R_2$ is a phenyl group substituted with an ethoxy group and a halogen.

11. The dye of claim 1 wherein $R_2$ is a phenyl group substituted with a methoxy group and a halogen.

12. The dye of claim 1 wherein $R_1$ is a member selected from the group consisting of hydrogen, methyl, ethyl, and mixtures thereof.

13. The dye of claim 1 having the structure:

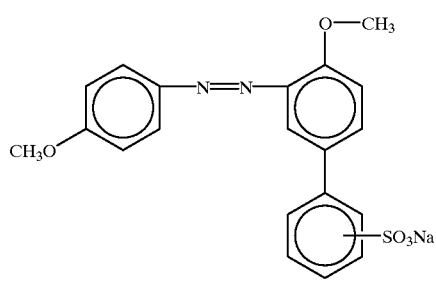

14. The dye of claim 1 having the structure:

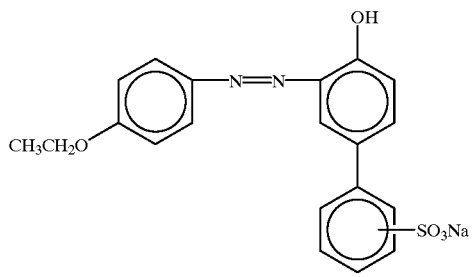

15. The dye of claim 1 having the structure:

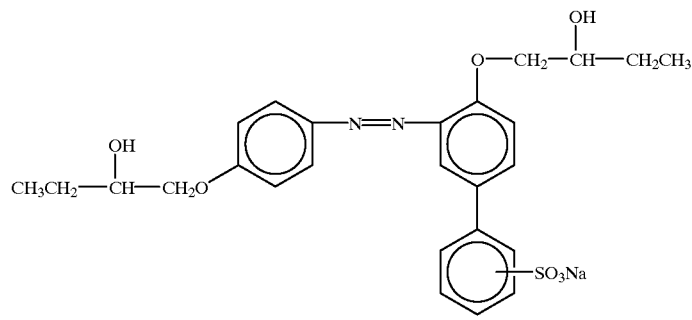

16. The dye of claim 1 having the structure:

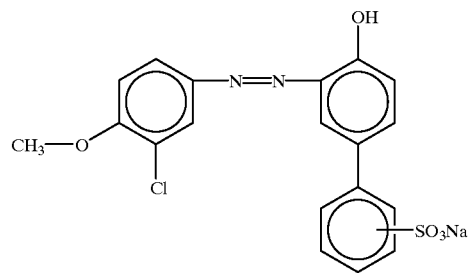

17. A dye composition comprising a plurality of dyes of the formula:

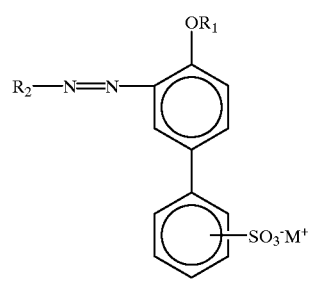

wherein:

M⁺ is Na⁺, Li⁺, K⁺, NH₄⁺, or hydroxyalkylammonium of the formula [H—(OCH₂CH₂)ₙ]ₚ NHₘ, where n is 1 to 5, p is 1 to 3, and p+m is 4;

R₁ is hydrogen, a metal ion, an alkyl of $C_{1-4}$, or hydroxyalkyl of $C_{1-4}$, and combinations thereof; and R₂ is a phenyl group substituted with at least one member selected from the group consisting of: alkyl; alkoxy; hydroxyalkoxy; halogen; hydroxyl; $C_2$–$C_6$ acylamino, perfluoroalkyl, substituted or unsubstituted benzoylamino; HO₃SOCH₂CH₂SO₂⁻; vinyl sulfone or moiety that can undergo elimination to form the vinyl sulfone structure; amino substituted with an alkyl of $C_{1-4}$, a dialkyl of $C_{1-4}$, substituted or unsubstituted phenyl, diphenyl, or combinations thereof; and combinations thereof.

18. The dye composition of claim 12 wherein R₂ of at least one of said dyes is a phenyl group with a methoxy group para to the azo group.

19. The dye composition of claim 12 wherein R₂ of at least one of said dyes is a phenyl group with an ethoxy group para to the azo group.

20. The dye composition of claim 12 wherein R₂ of at least one of said dyes is a phenyl group with a 2-hydroxypropoxy-group para to the azo group.

21. The dye composition of claim 12 wherein R₂ of at least one of said dyes is a phenyl group with a 2-hydroxybutoxy-group para to the azo group.

22. The dye composition of claim 18 wherein M⁺ of at least one of said dyes is Na⁺.

23. The dye composition of claim 19 wherein M⁺ of at least one of said dyes is Na⁺.

24. The dye composition of claim 20 wherein M⁺ of at least one of said dyes is Na⁺.

25. The dye composition of claim 21 wherein M⁺ of at least one of said dyes is Na⁺.

26. The dye composition of claim 17 wherein R₂ of at least one of said dyes is a phenyl group substituted with an ethoxy group and a halogen.

27. The dye composition of claim 17 wherein R₂ of at least one of said dyes is a phenyl group substituted with a methoxy group and a halogen.

28. A dye composition comprising a first dye of the formula:

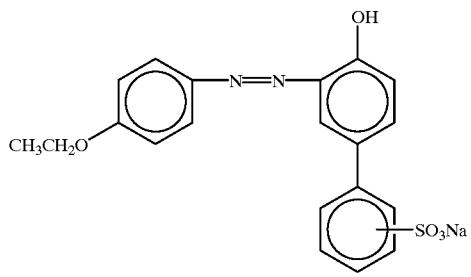

and a second dye of the formula:

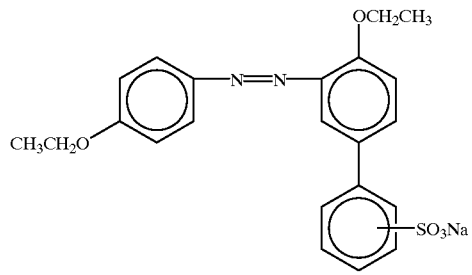

29. A process for dyeing a material comprising:
selecting at least one first acid dye for said material;
selecting at least one second acid dye, wherein said second acid dye is an acid yellow dye that is compatible on said material with said first acid dye and is of the formula:

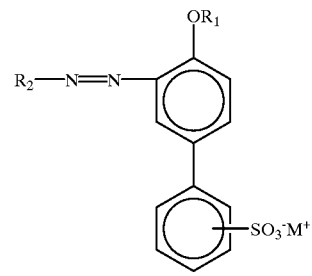

30. The process of claim 29 wherein said effective dyeing temperature is between ambient temperature and about 205° F.

31. The process of claim 29 wherein said sufficient time to exhaust said first acid dye and said second acid yellow dye is between about 2 minutes and about 20 minutes.

32. The process of claim 29 wherein two acid yellow dyes of the indicated Formula are selected wherein:

R₂ of the first acid yellow dye is a phenyl group substituted with a halogen and, optionally, at least one member selected from the group consisting of: alkyl; alkoxy; hydroxyalkoxy; halogen; hydroxyl; $C_2$–$C_6$ acylamino, perfluoroalkyl, substituted or unsubstituted benzoylamino; HO₃SOCH₂CH₂SO₂⁻; vinyl sulfone or moiety that can undergo elimination to form the vinyl sulfone structure; amino substituted with an alkyl of $C_{1-4}$, a dialkyl of $C_{1-4}$, substituted or unsubstituted phenyl, diphenyl, or combinations thereof; and combinations thereof;

R₂ of the second acid yellow dye is a phenyl group substituted with at least one member selected from the group consisting of: alkyl; alkoxy; hydroxyalkoxy; halogen; hydroxyl; $C_2$–$C_6$ acylamino, perfluoroalkyl, substituted or unsubstituted benzoylamino; HO₃SOCH₂CH₂SO₂⁻; vinyl sulfone or moiety that can undergo elimination to form the vinyl sulfone structure; amino substituted with an alkyl of $C_{1-4}$, a dialkyl of $C_{1-4}$, substituted or unsubstituted phenyl, diphenyl, or combinations thereof; and combinations thereof.

33. The process of claim 29 wherein two acid yellow dyes of the indicated Formula are selected and R₂ for at least one of said acid yellow dyes is a phenyl group substituted para to the azo group with a member selected from the group consisting of a methoxy group, an ethoxy group, a 2-hydroxypropoxy-group, and a 2-hydroxybutoxy-group.

34. The process of claim 32 wherein $M^+$ is $Na^+$.

35. The process of claim 33 wherein $M^+$ is $Na^+$.

36. The process of claim 29 wherein the material is a polyamide.

37. The process of claim 36 wherein the polyamide material is a fiber.

38. The process of claim 36 wherein the polyamide material is a fabric.

39. A material dyed by a process comprising:

selecting at least one first acid dye for said material;

selecting at least one second acid dye, wherein said second acid dye is an acid yellow dye that is compatible on said material with said first acid dye and is of the formula:

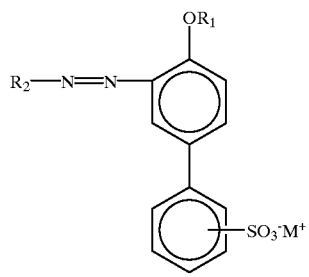

wherein:

$M^+$ is $Na^+$, $Li^+$, $K^+$, $NH_4^+$, or hydroxyalkylammonium of the formula $[H-(OCH_2CH_2)_n]_p NH_m$, where n is 1 to 5, p is 1 to 3, and p+m is 4;

$R_1$ is hydrogen, a metal ion, an alkyl of $C_{1-4}$, hydroxyalkyl of $C_{1-4}$, or combinations thereof; and $R_2$ is a phenyl group substituted with at least one member selected from the group consisting of: alkyl; alkoxy; hydroxyalkoxy; halogen; hydroxyl; $C_2$–$C_6$ acylamino; perfluoroalkyl; substituted or unsubstituted benzoylamino; $HO_3SOCH_2CH_2SO_2^-$; vinyl sulfone or moiety that can undergo elimination to form the vinyl sulfone structure; amino substituted with an alkyl of $C_{1-4}$ or a dialkyl of $C_{1-4}$, substituted or unsubstituted phenyl, diphenyl, or combinations thereof; and combinations thereof;

mixing said first acid dye with said second acid yellow dye at an effective dyeing temperature for said material;

immersing said material into said heated mixture of said first acid dye and said second acid yellow dye for sufficient time to exhaust said first acid dye and said second acid yellow dye; and drying said dyed material.

40. The material of claim 39 wherein said material is a polyamide.

41. The material of claim 40 wherein said polyamide material is a fiber.

42. The material of claim 41 wherein said polyamide material is a fabric.

* * * * *